(12) United States Patent
Oakley

(10) Patent No.: US 7,126,588 B2
(45) Date of Patent: *Oct. 24, 2006

(54) MULTIPLE MODE DISPLAY APPARATUS

(75) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/185,154

(22) Filed: Jun. 27, 2002

(65) Prior Publication Data

US 2004/0001049 A1    Jan. 1, 2004

(51) Int. Cl.
*G09G 5/00* (2006.01)

(52) U.S. Cl. .................. 345/169; 345/168; 345/173

(58) Field of Classification Search ........ 345/103, 345/98, 100, 156–157, 197, 173, 1.1, 1.2, 345/9, 169, 175, 176, 87, 102, 172, 905; 178/18.01; 361/680–683; 455/556.1; D14/315
See application file for complete search history.

(56) References Cited

U.S. PATENT DOCUMENTS

| | | | |
|---|---|---|---|
| 4,839,837 A | 6/1989 | Chang | |
| 4,903,222 A | 2/1990 | Carter et al. | |
| 5,016,849 A | 5/1991 | Wu | |
| 5,049,862 A | 9/1991 | Dao et al. | |
| 5,196,993 A | 3/1993 | Herron et al. | |
| 5,278,779 A | 1/1994 | Conway et al. | |
| 5,283,862 A | 2/1994 | Lund | |
| 5,355,279 A | 10/1994 | Lee et al. | |
| 5,375,076 A | 12/1994 | Goodrich et al. | |
| 5,483,250 A | 1/1996 | Herrick | |
| 5,710,576 A * | 1/1998 | Nishiyama et al. | 345/169 |
| 5,796,577 A | 8/1998 | Ouchi et al. | |
| 5,841,431 A * | 11/1998 | Simmers | 345/211 |
| 5,867,140 A * | 2/1999 | Rader | 345/98 |
| 5,995,085 A * | 11/1999 | Bowen | 345/173 |
| 6,094,341 A | 7/2000 | Lin | |
| 6,144,358 A * | 11/2000 | Narayanaswamy et al. | 345/102 |

(Continued)

OTHER PUBLICATIONS

Bowman, D., "Ericsson R380 Smartphone," *GEEK.com PDA Review*, Nov. 24, 2000, pp. 1-11, http://www.geek.com/hwswrev/pda/ericr380/.

(Continued)

*Primary Examiner*—Richard Hjerpe
*Assistant Examiner*—Mansour M. Said
(74) *Attorney, Agent, or Firm*—Larry M. Mennemeier

(57) ABSTRACT

A multiple mode display apparatus and methods of use. An apparatus includes a display surface with a first and a second display area. A housing pivotally attached with the display proximate a first edge of the housing is displaceable from a coplanar position with the surface of the display device to a position wherein an angle of at least 90 degrees between the surface of the display and the housing is formed along said first edge. In the first position, the first display area is visible and activated to receive user input or to display output. The second display area is covered by the housing and placed in a mode of reduced power consumption. In the second position, the second display area is visible and activated to display output.

20 Claims, 16 Drawing Sheets

U.S. PATENT DOCUMENTS

| | | | |
|---|---|---|---|
| 6,154,359 A * | 11/2000 | Kamikakai et al. | 361/681 |
| 6,198,624 B1 | 3/2001 | Margaritis | |
| 6,219,681 B1 | 4/2001 | Hawkins et al. | |
| 6,256,192 B1 * | 7/2001 | Shannon | 361/683 |
| 6,259,597 B1 * | 7/2001 | Anzai et al. | 361/683 |
| 6,266,241 B1 | 7/2001 | Van Brocklin et al. | |
| 6,292,357 B1 | 9/2001 | Zamora et al. | |
| 6,295,038 B1 | 9/2001 | Rebeske | |
| D448,764 S | 10/2001 | Marsalka et al. | |
| 6,341,061 B1 | 1/2002 | Eisbach et al. | |
| 6,661,404 B1 * | 12/2003 | Sirola et al. | 345/168 |
| 6,865,075 B1 * | 3/2005 | Oakley | 361/683 |
| 2003/0132928 A1 * | 7/2003 | Kori | 345/204 |
| 2003/0151888 A1 * | 8/2003 | Chien et al. | 361/680 |

OTHER PUBLICATIONS

Greenberg, S., "Designing Computers As Public Artifacts," *Proceedings of Design Computing on the Net (DCNet'99)*, Nov. 30-Dec. 3, 1999, pp. 1-16, University of Sydney, http://www.arch.usyd.edu.au./kodc/journal/.

Lim, L., "Ericsson R380—The World in Your Hands," *iMobile.com.au (Australian On-Line Mobile Phone Magazine)*, Sep. 2001, pp. 1-3, http://www.imobile.com.au/PhoneReviews/default.asp?ID=reviewssep0101.

Williams, M., "Sony Unveils Cool new Vaio," *PCWORLD.COM*, Jan. 10, 2002, pp. 1-3 (plus three pictures), http://www.pcworld.com/news/article/0,aid,78983,00.asp.

\* cited by examiner

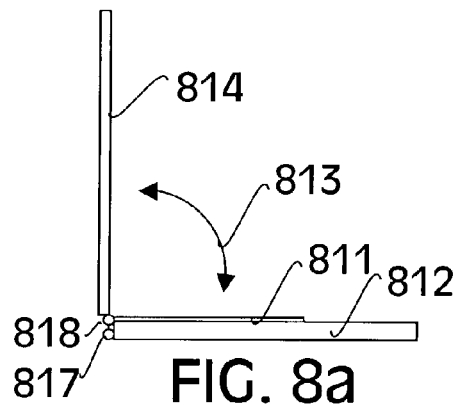
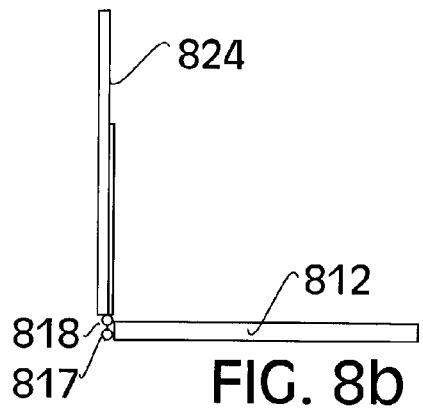
FIG. 8a  FIG. 8b
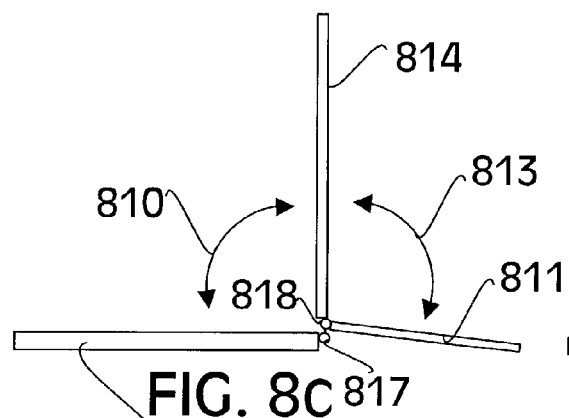
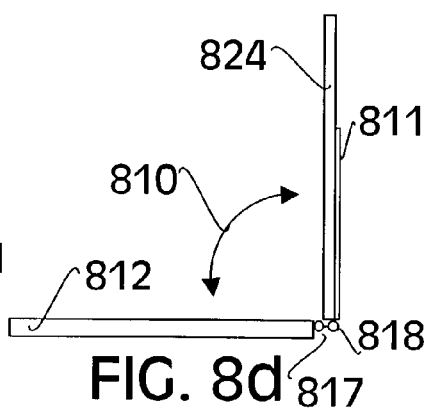
FIG. 8c  FIG. 8d
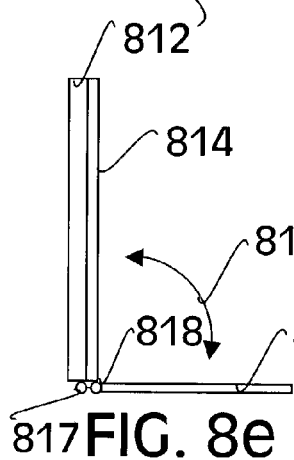
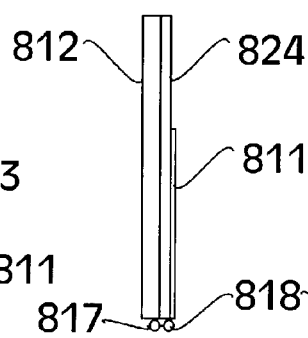
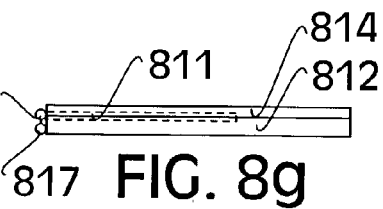
FIG. 8e  FIG. 8f  FIG. 8g

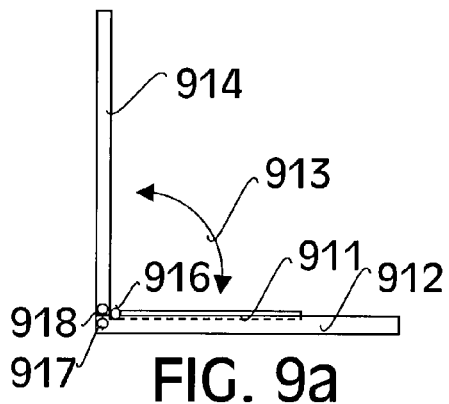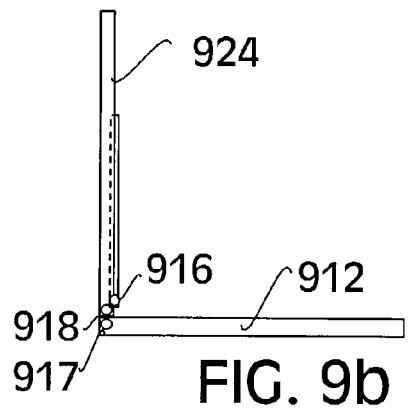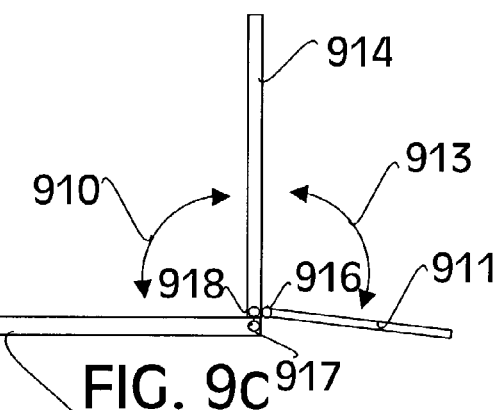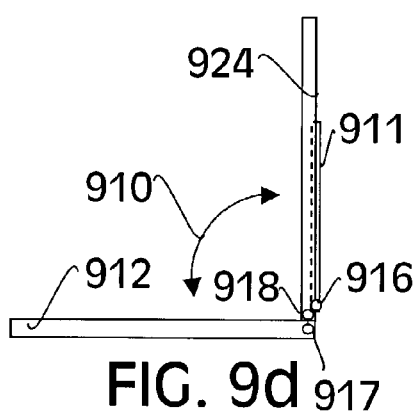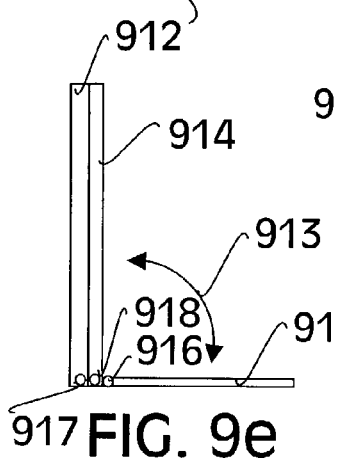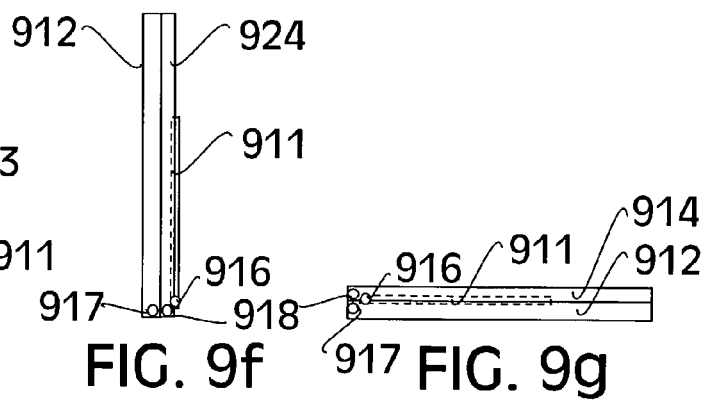

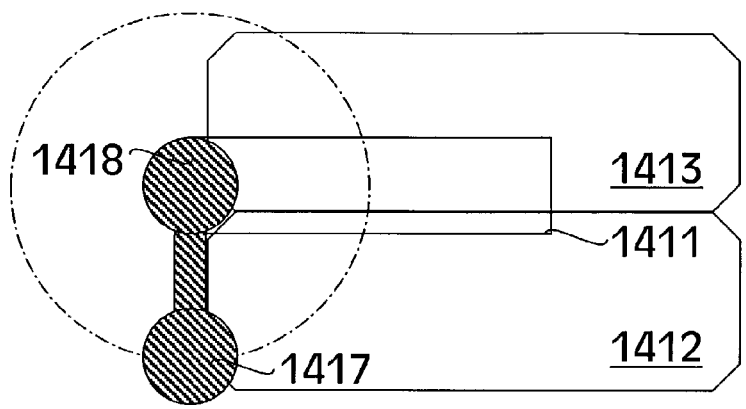
FIG. 14a
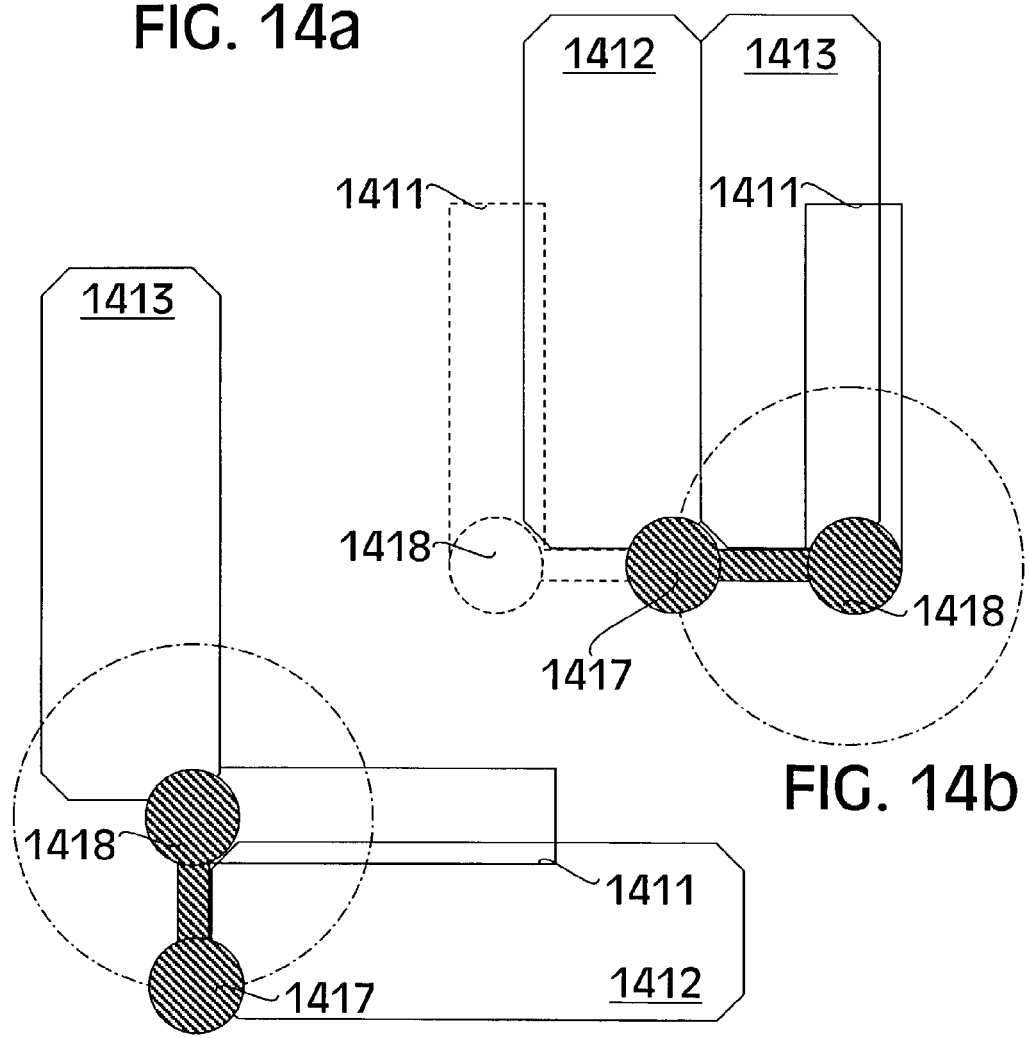
FIG. 14b
FIG. 14c

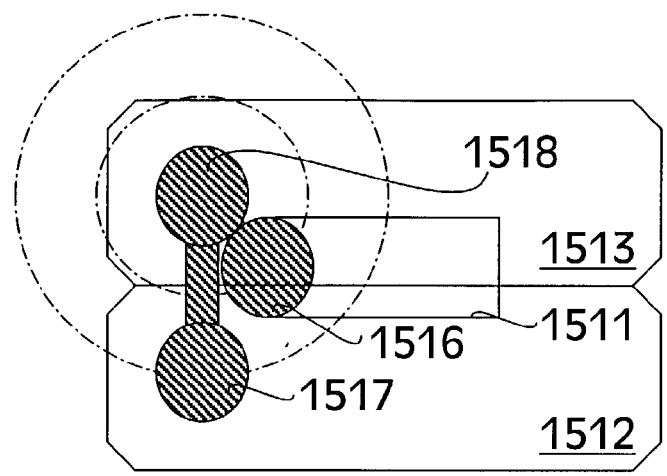
FIG. 15a
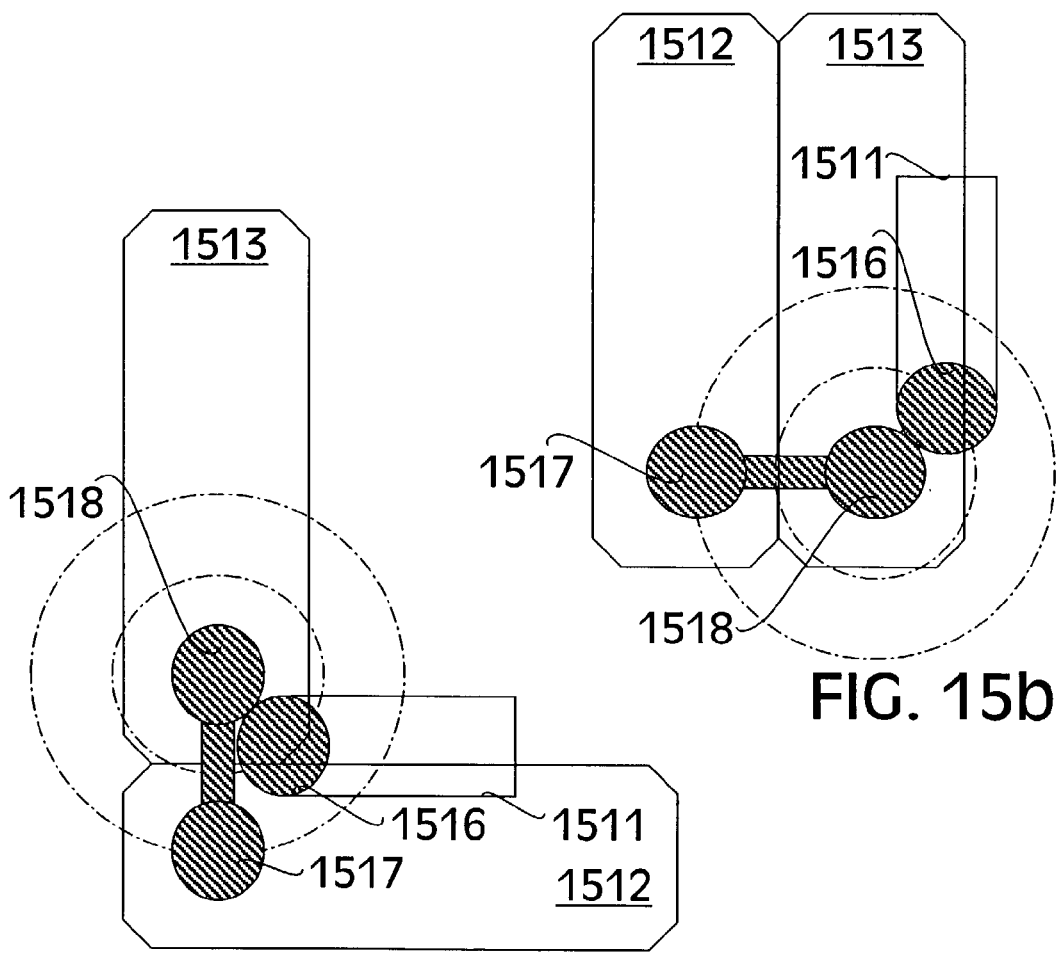
FIG. 15b
FIG. 15c

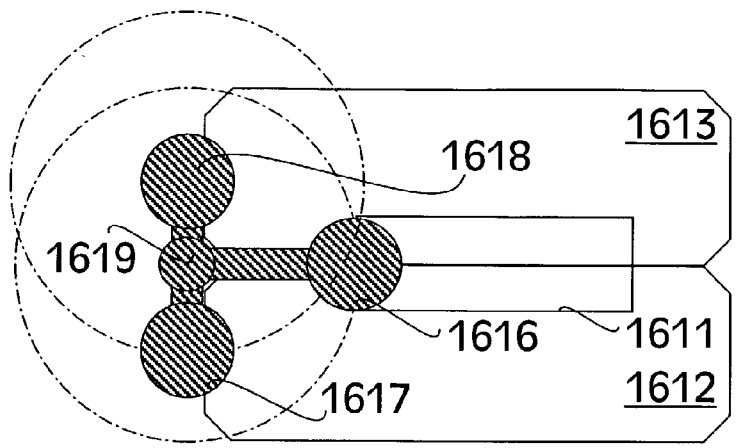
FIG. 16a
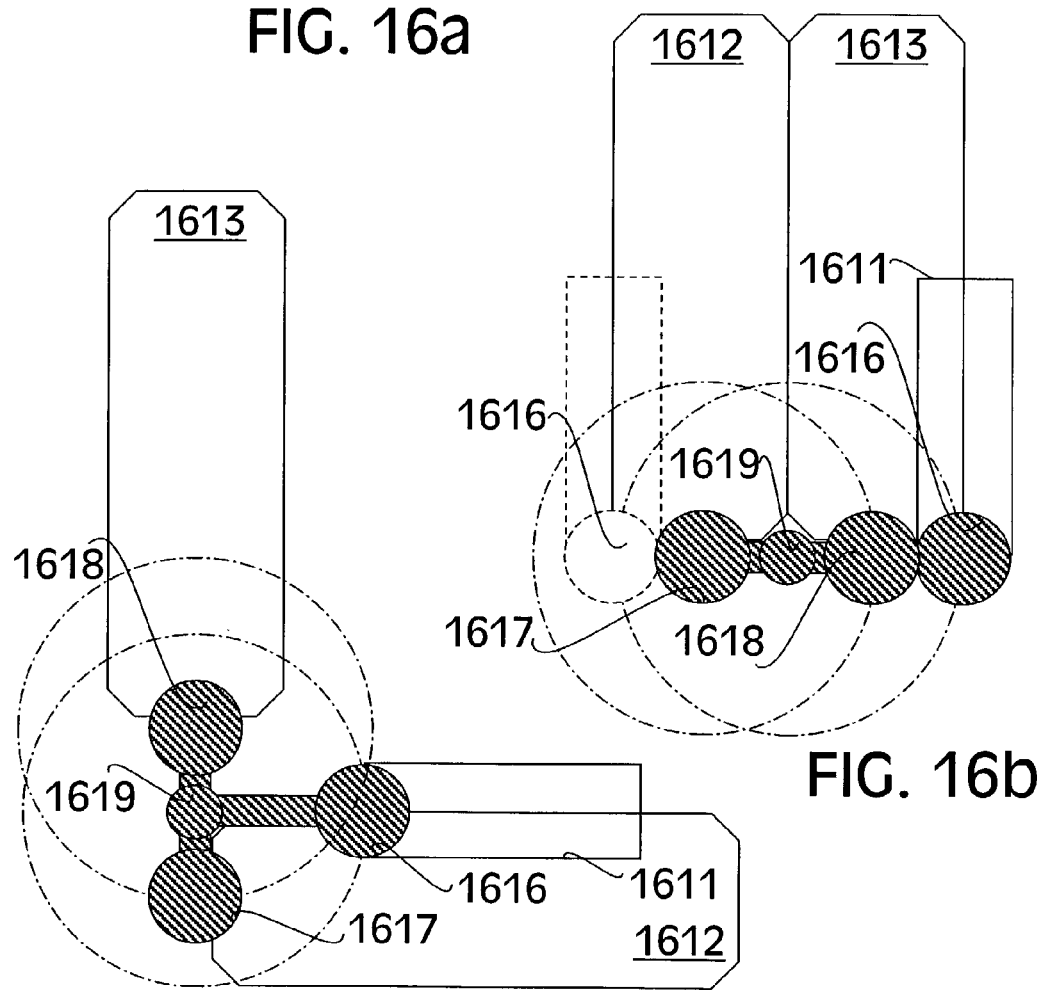
FIG. 16b
FIG. 16c

MULTIPLE MODE DISPLAY APPARATUS

FIELD OF THE DISCLOSURE

This disclosure relates generally to the field of digital computing devices. In particular, the disclosure relates to a display apparatus for user interaction in a plurality of configurations.

BACKGROUND OF THE DISCLOSURE

Today, a personal computing and/or communicating device such as a laptop or notebook computer, for example, or a tablet or palm-held computer, has a single typical mode of use. The display of a tablet computer, for example, may be touch-sensitive for interactive user input by a stylus or pen-like device. A notebook, on the other hand, may accept interactive user input through a keyboard or a pointing device such as a mouse or a touch pad. While personal computing and/or communicating devices are rapidly changing, with new technologies for displays, pointing devices, keyboards and such, the mode of interactive user input for a particular device is typically limited to a small number of fixed functional options with some support for the addition of peripheral devices and docking configurations.

Another common characteristic of current personal computing and/or communicating devices is the importance of battery life. System manufacturers go to great lengths to conserve power and charge premiums for the latest battery technologies. Processors have design features such as automatic frequency reduction directed at limiting power consumption and display devices dim backlighting when on battery power. Systems put themselves into a standby mode after a period of no user input or when power reserves reach a critical level.

At times, it may be inconvenient for a user to have such a limited range of options. A particular user may most often need to interact with a device while holding the device in one hand, but must store or carry along one or more peripherals in order to read data from a disk or to interact with the device through a keyboard or view a full color display. If an extra battery is not readily available, the user may be forced to terminate interactive use of the device until an alternative power source is available. This situation is especially prevalent since current display devices require a significant portion of a battery's power reserves. A user carrying a notebook computer may not require a full color display or even a keyboard to read email but the device may not be so flexible as to permit easy reconfiguration.

DESCRIPTION OF THE DRAWINGS

The present invention is illustrated by way of example and not limitation in the figures of the accompanying drawings.

FIG. 8a illustrates one embodiment of a transformable computing device having a first user interactive configuration with a fully active display area.

FIG. 8b illustrates a second user interactive configuration of the computing device of FIG. 8a with the keyboard housing covering part of the display area to place the display device in a mode of reduced power consumption while another part of the display area remains visible and interactive.

FIG. 8c illustrates a third user interactive configuration of the computing device of FIG. 8a with a fully active display area and with the base housing pivotally displaced to support the device from behind the display.

FIG. 8d illustrates a fourth user interactive configuration of the computing device of FIG. 8a with the keyboard housing pivotally displaced to a mode of reduced power consumption while the base housing is pivotally displaced to support the device from behind the display.

FIG. 8e illustrates a fifth user interactive configuration of the computing device of FIG. 8a with a fully active display area and with the base housing pivotally displaced to a coplanar position adjacent with the back surface of the display.

FIG. 8f illustrates a sixth user interactive configuration of the computing device of FIG. 8a with the keyboard housing pivotally displaced to a mode of reduced power consumption while the base housing is pivotally displaced to a coplanar position adjacent with the back surface of the display.

FIG. 8g illustrates a closed standby or shut down configuration of the computing device of FIG. 8a.

FIG. 9a illustrates an alternative embodiment of a transformable computing device having a first user interactive configuration with a fully active display area.

FIG. 9b illustrates a second user interactive configuration of the computing device of FIG. 9a with the keyboard housing covering part of the display area to place the display device in a mode of reduced power consumption while another part of the display area remains visible and interactive.

FIG. 9c illustrates a third user interactive configuration of the computing device of FIG. 9a with a fully active display area and with the base housing pivotally displaced to support the device from behind the display.

FIG. 9d illustrates a fourth user interactive configuration of the computing device of FIG. 9a with the keyboard housing pivotally displaced to a mode of reduced power consumption while the base housing is pivotally displaced to support the device from behind the display.

FIG. 9e illustrates a fifth user interactive configuration of the computing device of FIG. 9a with a fully active display area and with the base housing pivotally displaced to a coplanar position adjacent with the back surface of the display.

FIG. 9f illustrates a sixth user interactive configuration of the computing device of FIG. 9a with the keyboard housing pivotally displaced to a mode of reduced power consumption while the base housing is pivotally displaced to a coplanar position adjacent with the back surface of the display.

FIG. 9g illustrates a closed standby or shut down configuration of the computing device of FIG. 9a.

FIG. 14a illustrates in detail one alternative embodiment of a closed, standby or shut down configuration of a transformable computing device.

FIG. 14b illustrates in detail a user interactive configuration of the transformable computing device of FIG. 14a with the keyboard housing optionally displaced to a mode of reduced power consumption while the base housing is pivotally displaced to a coplanar position adjacent with the back surface of the display.

FIG. 14c illustrates in detail another user interactive configuration of the transformable computing device of FIG. 14a with a fully active display area, the keyboard housing being supported by the base housing which is pivotally displaced to form an angle with display surface of substantially 90 degrees.

FIG. 15a illustrates in detail another alternative embodiment of a closed, standby or shut down configuration of a transformable computing device.

FIG. 15b illustrates in detail a user interactive configuration of the transformable computing device of FIG. 15a with the keyboard housing optionally displaced to a mode of reduced power consumption while the base housing is pivotally displaced to a coplanar position adjacent with the back surface of the display.

FIG. 15c illustrates in detail another user interactive configuration of the transformable computing device of FIG. 15a with a fully active display area, the keyboard housing being supported by the base housing which is pivotally displaced to form an angle with display surface of substantially 90 degrees.

FIG. 16a illustrates in detail another alternative embodiment of a closed, standby or shut down configuration of a transformable computing device.

FIG. 16b illustrates in detail a user interactive configuration of the transformable computing device of FIG. 16a with the keyboard housing optionally displaced to a mode of reduced power consumption while the base housing is pivotally displaced to a coplanar position adjacent with the back surface of the display.

FIG. 16c illustrates in detail another user interactive configuration of the transformable computing device of FIG. 16a with a fully active display area, the keyboard housing being supported by the base housing which is pivotally displaced to form an angle with display surface of substantially 90 degrees.

DETAILED DESCRIPTION

Figure 1:
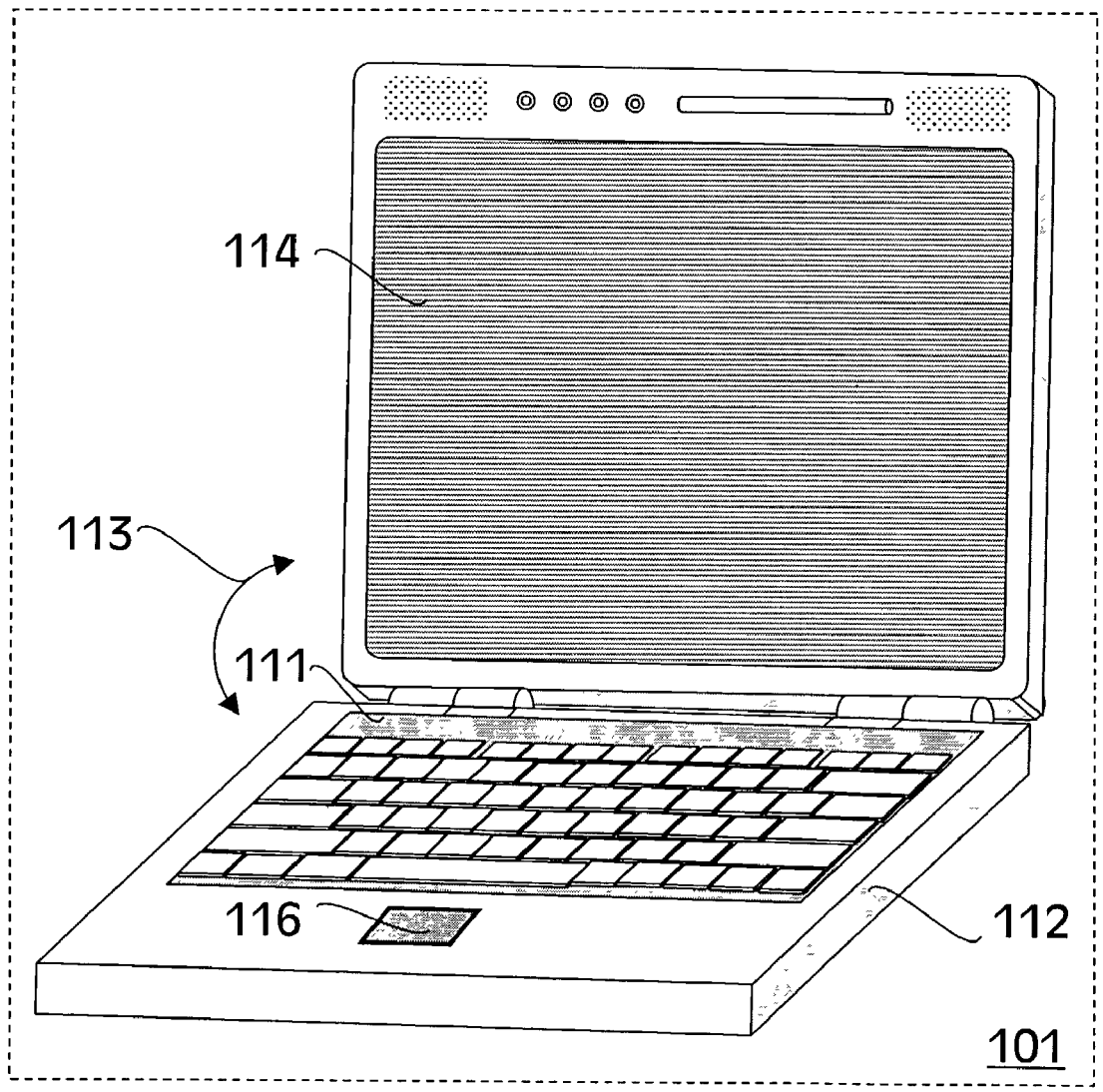
FIG. 1 illustrates one embodiment of a computing device having a first user interactive configuration with a fully active display area.

Disclosed herein is a multiple mode display apparatus and methods of use. One embodiment of an apparatus includes a display surface with a first and a second display area. A housing pivotally attached with the display proximate a first edge of the housing is displaceable from a coplanar position with the surface of the display device to a position wherein an angle of at least 90 degrees between the surface of the display and the housing is formed along said first edge. In the first position, the first display area is visible and activated to receive user input or to display output, but the second display area is covered by the housing and placed in a mode of reduced power consumption. In the second position, the second display area is visible and activated to display output.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A computing device or a communicating device may be understood to mean any one of a variety of devices for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, or digital audio recorder/players.

A keyboard or a key-entry device may be understood to mean any one of a variety of devices for keyed entry of data, including but not limited to a combination of one or more of the following: an alpha-numeric keyboard having symbols of any language; a telephone keypad having numeric or alpha-numeric keys and/or various redial, memory-dial, messaging or other function keys and optionally including a glide-point or other pointing device; a numeric keypad with various mathematical operation keys; a directional keypad with arrows, menus or selection keys; a gaming keypad; an entertainment or presentation key-entry device with various seek, scan, play, reverse, fast-forward, channel select, volume control, level control or other function keys; a cash register keyboard; or any custom key-entry device having mechanical, electronic, printed, projected or other type of keys for user interaction.

A display may be understood to mean any one of a variety of devices for displaying data, images, icons, etc. It may comprise a continuous or discontinuous, flat, curved or flexible display surface including but not limited to a combination of one or more of the following technologies: liquid crystal with amorphous silicon thin-film transistor, metal-insulator-metal, or polysilicon thin-film transistor active matrix displays or liquid crystal with color super-twist nematic, double-layer supertwist nematic, high performance addressing, or dual scan passive matrix displays; back lit displays; electroluminescent displays; gas plasma displays; plasma addressed liquid crystal displays; digital visual interface displays; field emission displays; cathode ray tube displays; thin cold cathode displays; organic light-emitting diode displays; light-emitting polymer displays; touch screen displays using multi-wire resistive, surface wave, touch-on-tube, or infrared touch sensing; interlaced or progressive scanned displays; heads-up displays; back-projecting displays; reflective displays; or holographic autostereoscopic displays.

It will be appreciated that the invention may be modified in arrangement and detail by those skilled in the art without departing from the principles of the present invention within the scope of the accompanying claims and their equivalents.

Turning now to FIG. 1, one embodiment of a computing device is illustrated, the computing device having a first user interactive configuration 101 with a fully active display area 114. The computing device also includes base housing 112, keyboard housing 111, and pointing device 116. In one embodiment, base housing 112 is pivotally attached with display area 114 and comprises one or more processors, and a rechargeable battery. In one embodiment, keyboard housing 111 is electrically connected with base housing 112 by wires, and in an alternative embodiment keyboard housing 111 comprises a wireless keyboard. In the first user interactive configuration 101, keyboard housing 111 forms an angle 113 with display area 114 of substantially 90 degrees or more. For one embodiment of the first user interactive configuration 101, keyboard housing 111 and pointing device 116 are both active to receive user input.

Figure 2:
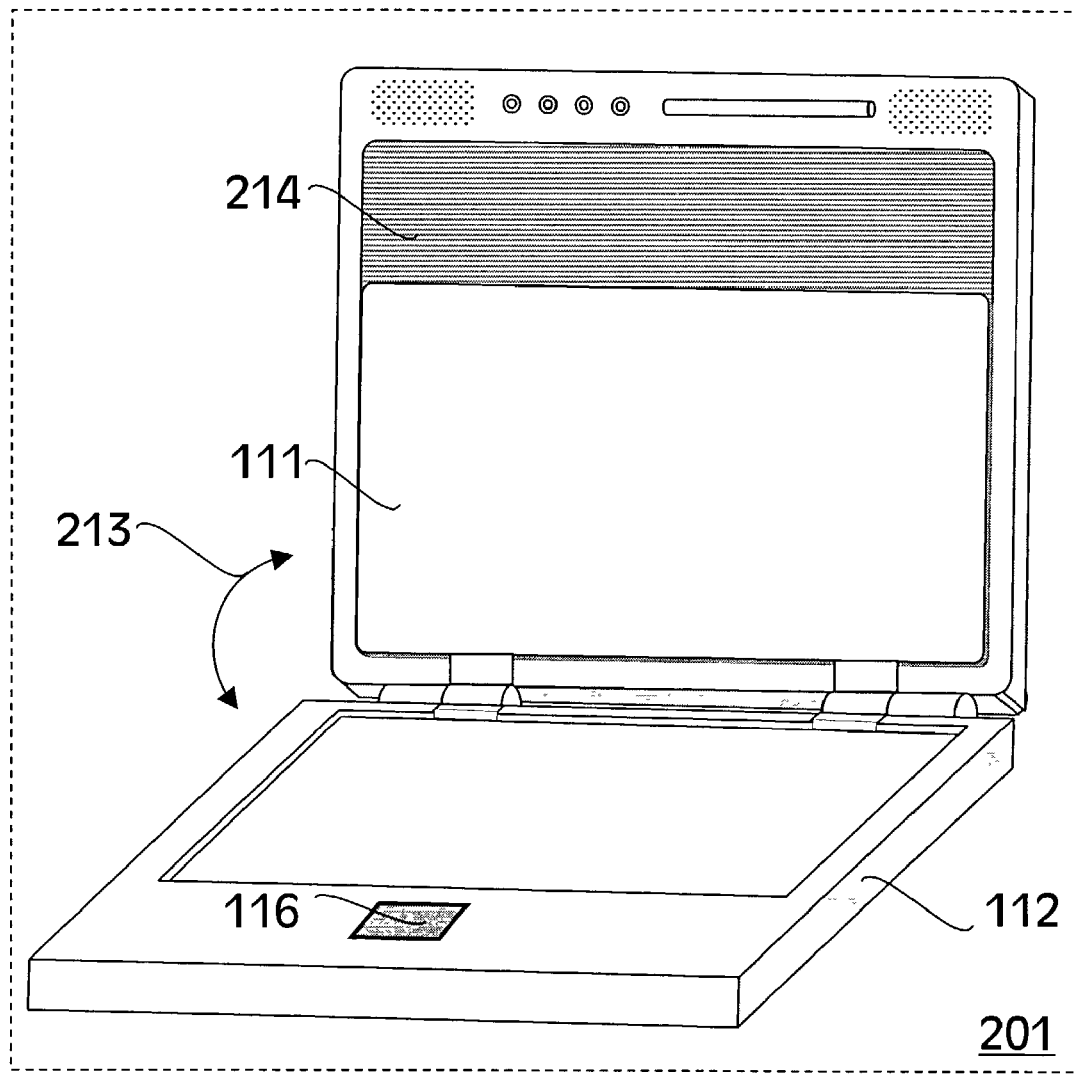
FIG. 2 illustrates a second user interactive configuration of the computing device of FIG. 1 with the keyboard housing covering part of the display area to place the display device in a mode of reduced power consumption while another part of the display area remains visible and interactive.

FIG. 2 illustrates a second user interactive configuration 201 of the computing device of FIG. 1 with the keyboard housing 111 covering a portion of the display area 114 to place the display device in a mode of reduced power consumption while another portion 214 of the display area remains visible and interactive. For one embodiment of the computing device, keyboard housing 111 is pivotally attached with display area 114, and displaced from the position of the first user interactive configuration 101 to a position substantially coplanar with display area 114 in the second user interactive configuration 201. For one alternative embodiment of the computing device, keyboard housing 111 is deactivated to transmit user input in the second user interactive configuration 201.

Figure 3:
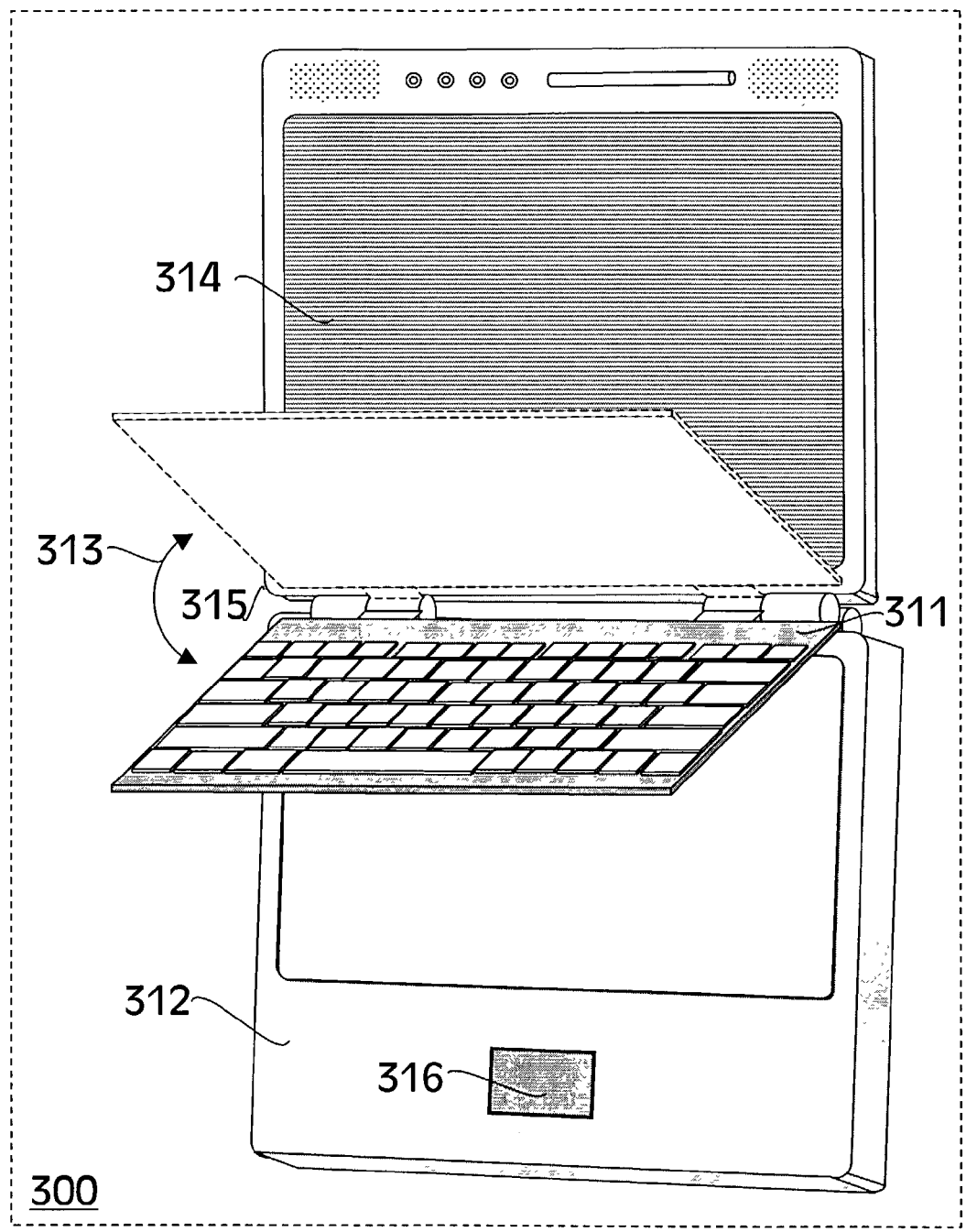
FIG. 3 illustrates one embodiment of a computing device having a pivotally attached keyboard housing.

FIG. 3 illustrates one embodiment of a computing device 300 having a display device 314 and a keyboard housing 311, which is pivotally attached with display device 314 proximate edge 315. For one embodiment of computing device 300, keyboard housing 311 is pivotally displaceable about edge 315 from a first position substantially coplanar with the surface of the display device 314 wherein a bottom portion of the display area of display device 314 is visually obscured by keyboard housing 311 and is not active to display output. Keyboard housing 311 is also displaceable to a second position with the surface of display device 314 wherein the bottom portion of the display area is visible and the entire display area of display device 314 is active to display output.

Figure 4:
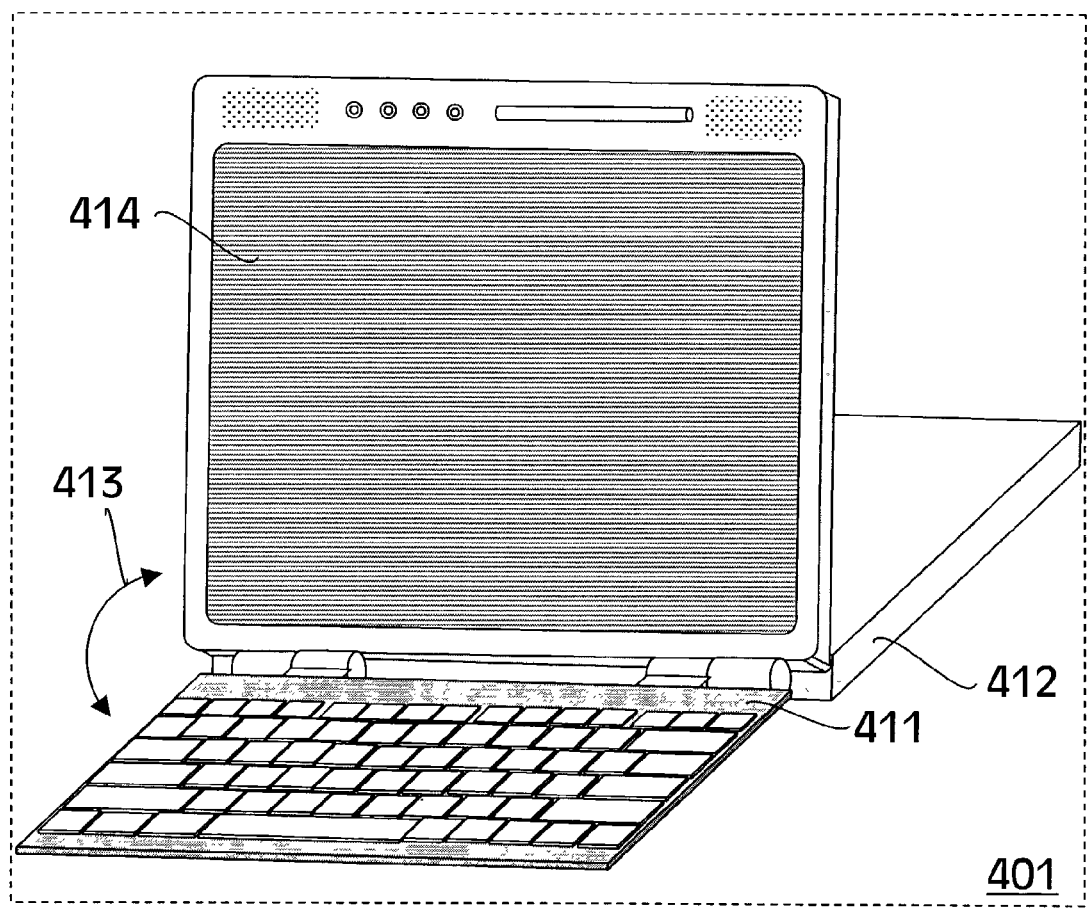
FIG. 4 illustrates an alternative embodiment of a computing device having a first user interactive configuration with a fully active display area.

FIG. 4 illustrates an alternative embodiment of a computing device having a first user interactive configuration 401 with a fully active display area 414. The computing device includes base housing 412, and keyboard housing 411. In one embodiment, base housing 412 is pivotally attached with display area 414. For one embodiment of the first user interactive configuration 401, keyboard housing 411 forms an angle 413 with display area 414 of substantially 90 degrees or more. For one embodiment of the first user interactive configuration 401, keyboard housing 411 is active to receive user input.

Figure 5:
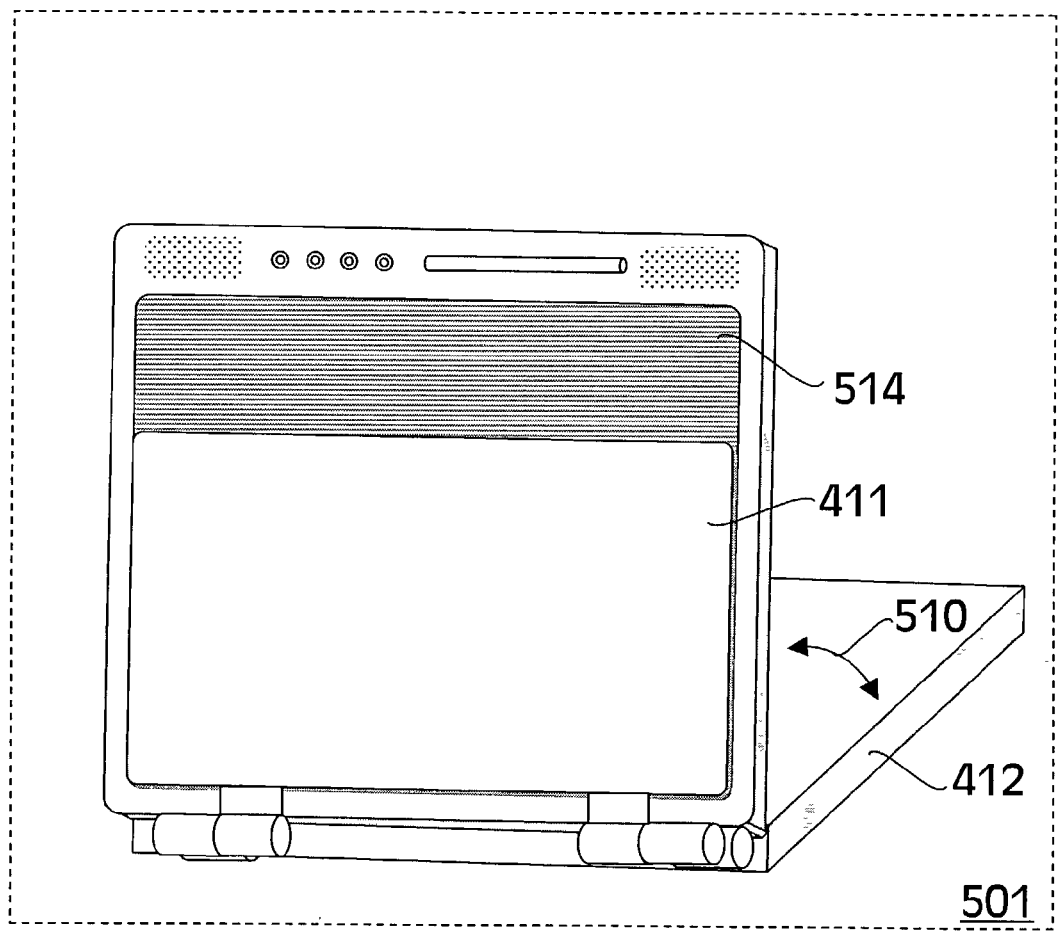
FIG. 5 illustrates a second user interactive configuration of the computing device of FIG. 4 with the keyboard housing covering part of the display area to place the display device in a mode of reduced power consumption while another part of the display area remains visible and interactive.

FIG. 5 illustrates a second user interactive configuration 501 of the computing device of FIG. 4 with the keyboard housing 411 covering a portion of the display area 414 to place the display device in a mode of reduced power consumption while another portion 514 of the display area remains visible and interactive. For one embodiment of the computing device, keyboard housing 411 is pivotally attached with display area 414, and displaced from the position of the first user interactive configuration 401 to a position substantially coplanar with display area 414 in the second user interactive configuration 501. For one alternative embodiment of the computing device, keyboard housing 411 is deactivated to transmit user input in the second user interactive configuration 401. For one alternative embodiment of the second user interactive configuration 501, base housing 412 is pivotally displaceable about an angle 513 with respect to display area 414 and keyboard housing 411.

Figure 6:
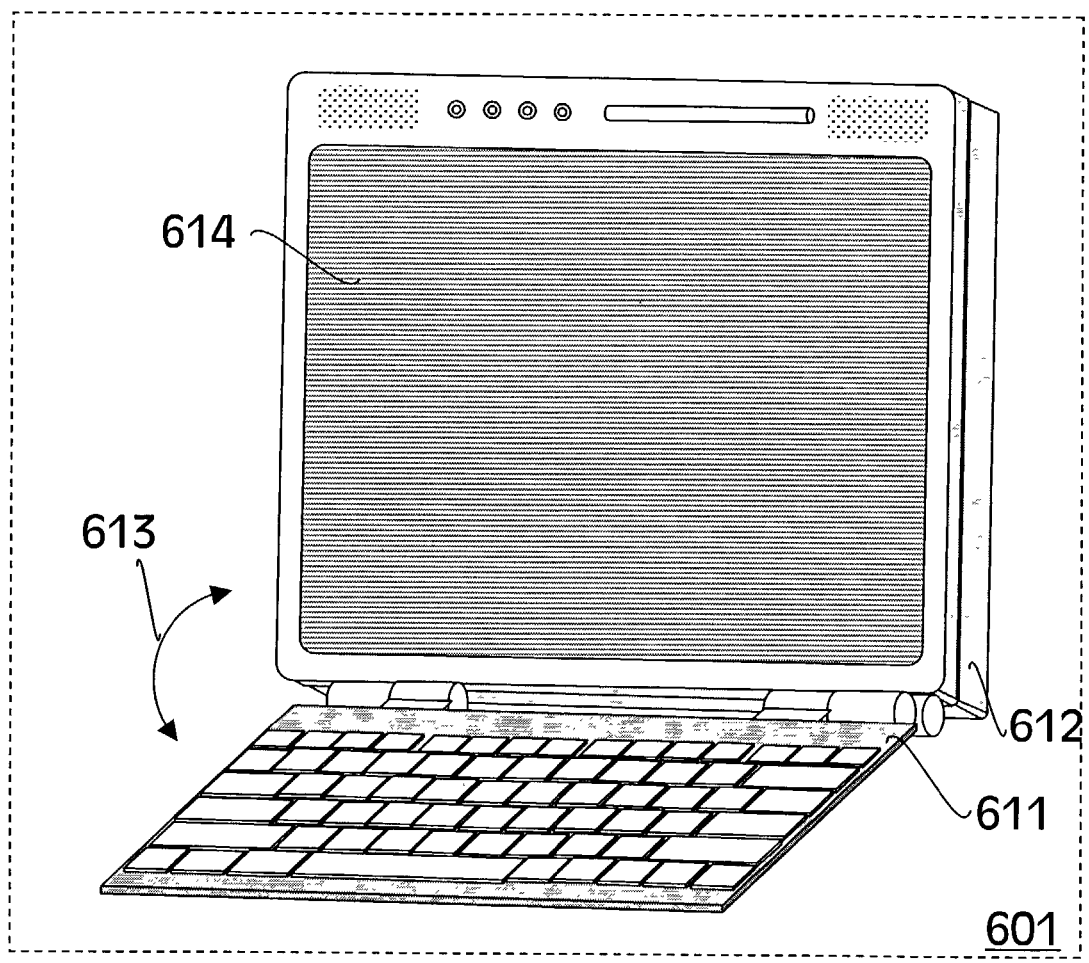
FIG. 6 illustrates another alternative embodiment of a computing device having a first user interactive configuration with a fully active display area.

FIG. 6 illustrates another alternative embodiment of a computing device having a first user interactive configuration 601 with a fully active display area 614. The computing device includes base housing 612, and keyboard housing 611. For one embodiment of the first user interactive configuration 601, keyboard housing 611 forms an angle 613 with display area 614 of substantially 90 degrees or more. For one embodiment of the first user interactive configuration 601, keyboard housing 611 is active to receive user input.

Figure 7:
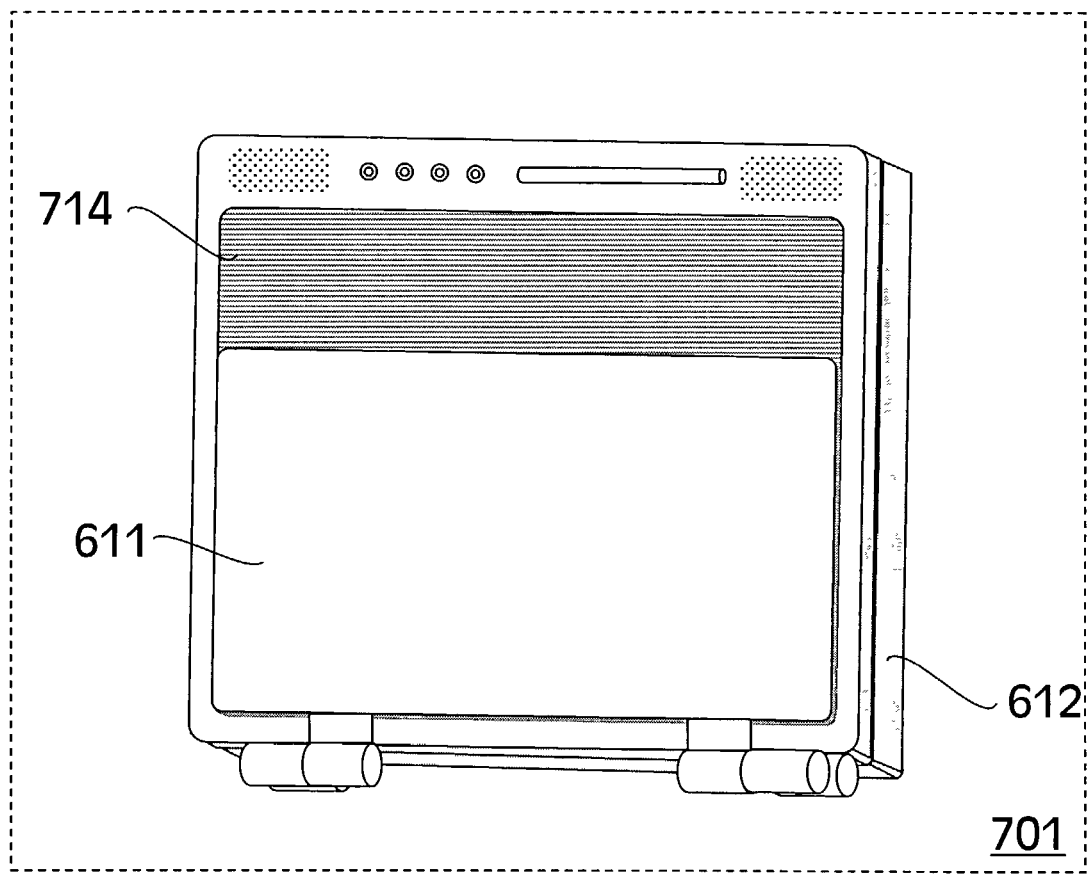
FIG. 7 illustrates a second user interactive configuration of the computing device of FIG. 6 with the keyboard housing covering part of the display area to place the display device in a mode of reduced power consumption while another part of the display area remains visible and interactive.

FIG. 7 illustrates a second user interactive configuration 701 of the computing device of FIG. 6 with the keyboard housing 611 covering a portion of the display area 614 to place the display device in a mode of reduced power consumption while another portion 714 of the display area remains visible and interactive. For one embodiment of the computing device, keyboard housing 611 is pivotally attached with display area 614, and displaced from the position of the first user interactive configuration 601 to a position substantially coplanar with display area 714 in the second user interactive configuration 701. For one alternative embodiment of the computing device, keyboard housing 611 is deactivated to transmit user input in the second user interactive configuration 701.

FIG. 8a illustrates one embodiment of a transformable computing device having a first user interactive configuration with a fully active display area 814 of a display housing and a keyboard housing 811 pivotally attached about pivot axis 818, keyboard housing 811 forming an angle 813 with display area 814 of substantially 90 degrees or more. For one embodiment of the transformable computing device, base housing 812 is pivotally attached about pivot axis 817 with respect to display area 814, pivot axis 818 and keyboard housing 811. For one alternative embodiment of the transformable computing device, pivot axis 817 and pivot axis 818 function as a double acting hinge. For another alternative embodiment of the transformable computing device, pivot axis 818 may be divided to permit display area 814 and keyboard housing 811 to pivot independently about pivot axis 817, functioning as a pair of double acting hinges.

FIG. 8b illustrates a second user interactive configuration of the computing device of FIG. 8a with the keyboard housing 811 covering part of the display area 814 to place the display device in a mode of reduced power consumption while another part 824 of the display area remains visible and interactive. Keyboard housing 811 is displaced about pivot axis 818 from the position of the first user interactive configuration to a position substantially coplanar with display area 814 in the second user interactive configuration.

FIG. 8c illustrates a third user interactive configuration of the computing device of FIG. 8a with a fully active display area 814 and with the base housing 812 pivotally displaced about pivot axis 817, base housing 812 forming an angle 810 with a back surface opposite display area 814 of substantially 90 degrees to support the computing device from behind the display. Keyboard housing 811 forms an angle 813 about pivot axis 818 with the front surface of display area 814 of substantially 90 degrees or more.

FIG. 8d illustrates a fourth user interactive configuration of the computing device of FIG. 8a with the keyboard housing 811 pivotally displaced about pivot axis 818 to a position substantially coplanar with display area 814 to place the display device in a mode of reduced power consumption. While keyboard housing 811 covers part of the display area 814, another part 824 of the display area remains visible and interactive. Base housing 812 is pivotally displaced about pivot axis 817, base housing 812 forming an angle 810 with the back surface opposite display area 814 of substantially 90 degrees to support the computing device from behind the display.

FIG. 8e illustrates a fifth user interactive configuration of the computing device of FIG. 8a with a fully active display area 814 and with the base housing 812 pivotally displaced about pivot axis 817 to a coplanar position adjacent with the back surface of the display. Keyboard housing 811 again forms an angle 813 about pivot axis 818 with the front surface of display area 814 of substantially 90 degrees or more.

FIG. 8f illustrates a sixth user interactive configuration of the computing device of FIG. 8a with the keyboard housing 811 pivotally displaced about pivot axis 818 to a mode of reduced power consumption while the base housing 812 is pivotally displaced about pivot axis 817 to a coplanar position adjacent with the back surface of the display. While keyboard housing 811 covers part of the display area 814, another part 824 of the display area remains visible and interactive. For one embodiment of the computing device, keyboard housing 811 is deactivated to transmit user input in the coplanar position adjacent with display area 814. For an alternative embodiment of the computing device, keyboard housing 811 is activated to transmit user input in the coplanar position adjacent with display area 814 but the covered part of display area 814 is deactivated.

FIG. 8g illustrates a closed standby or shut down configuration of the computing device of FIG. 8a. Keyboard housing 811 is pivotally displaced about pivot axis 818 and base housing 812 is pivotally displaced about pivot axis 817 to substantially coplanar positions adjacent with display area 814. The computing device, sensing the closed position of base housing 812 with respect to display area 814 enters a second mode of reduced power consumption. For one embodiment of the computing device, keyboard housing 811 is deactivated to transmit user input and all of display area 814 is deactivated. For an alternative embodiment base housing 812 enters a standby configuration.

FIG. 9a illustrates an alternative embodiment of a transformable computing device having a first user interactive configuration with a fully active display area 914 of a display housing pivotally attached about pivot axis 918 and a keyboard housing 911 pivotally attached about pivot axis 916, keyboard housing 911 forming an angle 913 with display area 914 of substantially 90 degrees or more. For one embodiment of the transformable computing device, base housing 912 is pivotally attached about pivot axis 917 with respect to display area 914, pivot axis 918, keyboard housing 911 and pivot axis 916. For one alternative embodiment of the transformable computing device, pivot axis 917 and pivot axis 918 function as a double acting hinge. For another alternative embodiment of the transformable computing device, pivot axis 916 and pivot axis 918 function as a second double acting hinge.

FIG. 9b illustrates a second user interactive configuration of the computing device of FIG. 9a with the keyboard housing 911 covering part of the display area 914 to place the display device in a mode of reduced power consumption while another part 924 of the display area remains visible and interactive. Keyboard housing 911 is displaced about pivot axis 916 and also about pivot axis 918 from the position of the first user interactive configuration to a position substantially coplanar with display area 914 in the second user interactive configuration.

FIG. 9c illustrates a third user interactive configuration of the computing device of FIG. 9a with a fully active display area 914 and with the base housing 912 pivotally displaced about pivot axis 917 forming an angle 910 with a back surface opposite display area 914 of substantially 90 degrees to support the computing device from behind the display. Keyboard housing 911 forms an angle 913 about pivot axis 916 and pivot axis 918 with the front surface of display area 914 of substantially 90 degrees or more.

FIG. 9d illustrates a fourth user interactive configuration of the computing device of FIG. 9a with the keyboard housing 911 pivotally displaced about pivot axis 916 and pivot axis 918 to a position substantially coplanar with display area 914 to place the display device in a mode of reduced power consumption. While keyboard housing 911 covers part of the display area 914, another part 924 of the display area remains visible and interactive. Base housing 912 is pivotally displaced about pivot axis 917 forming an angle 910 with the back surface opposite display area 914 of substantially 90 degrees to support the computing device from behind the display.

FIG. 9e illustrates a fifth user interactive configuration of the computing device of FIG. 9a with a fully active display area 914 and with the base housing 912 pivotally displaced about pivot axis 917 and pivot axis 918 to a coplanar position adjacent with the back surface of the display. Keyboard housing 911 again forms an angle 913 about pivot axis 916 and pivot axis 918 with the front surface of display area 914 of substantially 90 degrees or more.

FIG. 9f illustrates a sixth user interactive configuration of the computing device of FIG. 9a with the keyboard housing 911 pivotally displaced about pivot axis 916 and pivot axis 918 to a mode of reduced power consumption while the base housing 912 is pivotally displaced about pivot axis 917 and pivot axis 918 to a coplanar position adjacent with the back surface of the display. While keyboard housing 911 covers part of the display area 914, another part 924 of the display area remains visible and interactive. For one embodiment of the computing device, display area 914 is deactivated to transmit user input in the coplanar position adjacent with keyboard housing 911. For an alternative embodiment of the computing device, part 924 of the display area 914 is activated to transmit user input in the coplanar position adjacent with keyboard housing 911 but the covered part of display area 914 and keyboard housing 911 are deactivated.

FIG. 9g illustrates a closed standby or shut down configuration of the computing device of FIG. 9a. Keyboard housing 911 is pivotally displaced about pivot axis 916 and pivot axis 918 and base housing 912 is pivotally displaced about pivot axis 917 and pivot axis 918 to substantially coplanar positions adjacent with display area 914. The computing device, sensing the closed position of base housing 912 with respect to display area 914 enters a standby or shut down configuration.

Figure 10:
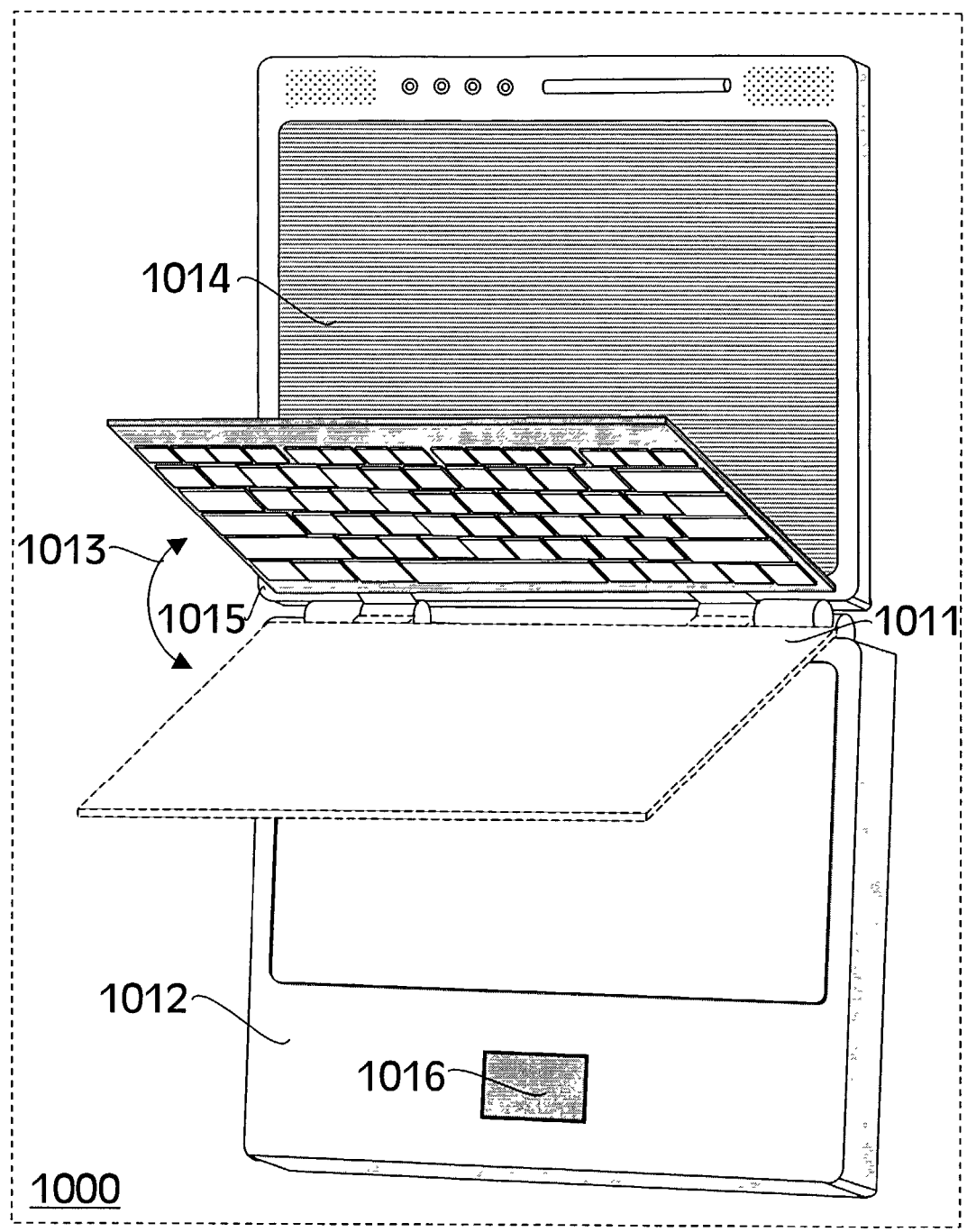
FIG. 10 illustrates an alternative embodiment of a computing device having a pivotally attached keyboard housing.

FIG. 10 illustrates an alternative embodiment of a computing device 1000 having a display device 1014 and a keyboard housing 1011, which is pivotally attached with display device 1014 proximate edge 1015 of a display housing. For one embodiment of computing device 1000, keyboard housing 1011 is pivotally displaceable about edge 1015 from a first position substantially coplanar with the surface of the display device 1014 wherein a portion of the display area of display device 1014 is visually obscured by keyboard housing 1011 and is not active to display output or to transmit user input. For one embodiment of computing device 1000, keyboard housing 1011 is active to transmit user input when in this first position. Keyboard housing 1011 is also displaceable to a second position with the surface of display device 1014 wherein the bottom portion of the display area is visible and the entire display area of display device 1014 is active to display output and to transmit user input (for example from a touch of a stylus, digit, light pen or other device).

Figure 11:
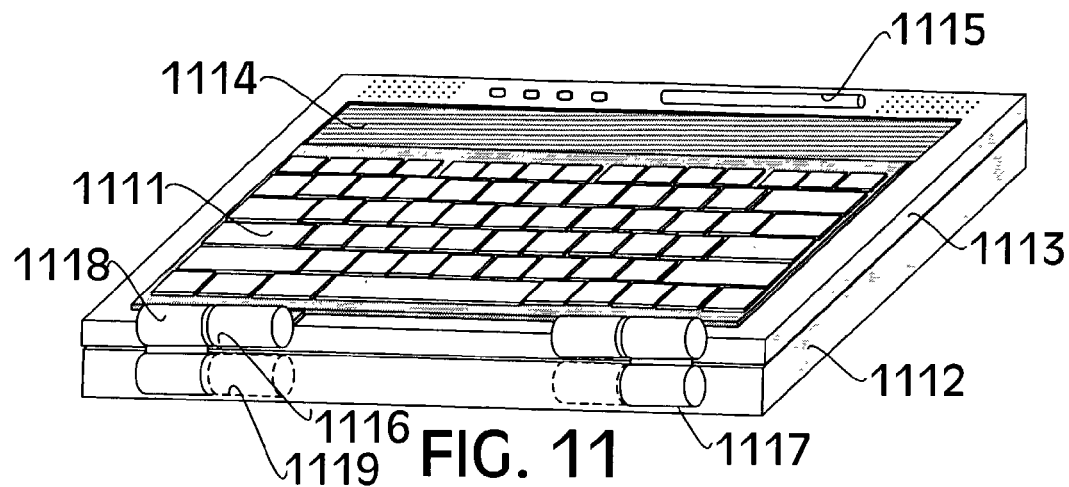
FIG. 11 illustrates one alternative embodiment of a user interactive configuration of a computing device in a mode of reduced power consumption with a keyboard housing covering part of the display area while another part of the display area remains visible and interactive, a base housing being pivotally displaced to a coplanar position adjacent with the back surface of the display.

FIG. 11 illustrates one alternative embodiment of a user interactive configuration of a computing device in a mode of reduced power consumption with a keyboard housing 1111 pivotally attached about pivot axis 1116 and covering a portion of the display area of display device 1113 while the display area 1114 remains visible and interactive, a base housing 1112 being pivotally displaced about pivot axis 1117 and pivot axis 1118 to a coplanar position adjacent with the back surface of display device 1113. For one embodiment keyboard housing 1111 is pivotally displaceable about a double acting hinge comprising pivot axis 1116 and pivot axis 1119 attached with base housing 1112. For another embodiment keyboard housing 1111 comprises a detachable and/or reversible keyboard. For one alternative embodiment display device 1113 is pivotally displaceable about a double acting hinge comprising pivot axis 1118 and pivot axis 1117 attached with base housing 1112. For another alternative embodiment keyboard housing 1111 is pivotally displaceable about pivot axis 1116 and/or pivot axis 1118 attached with display device 1113.

Figure 12:
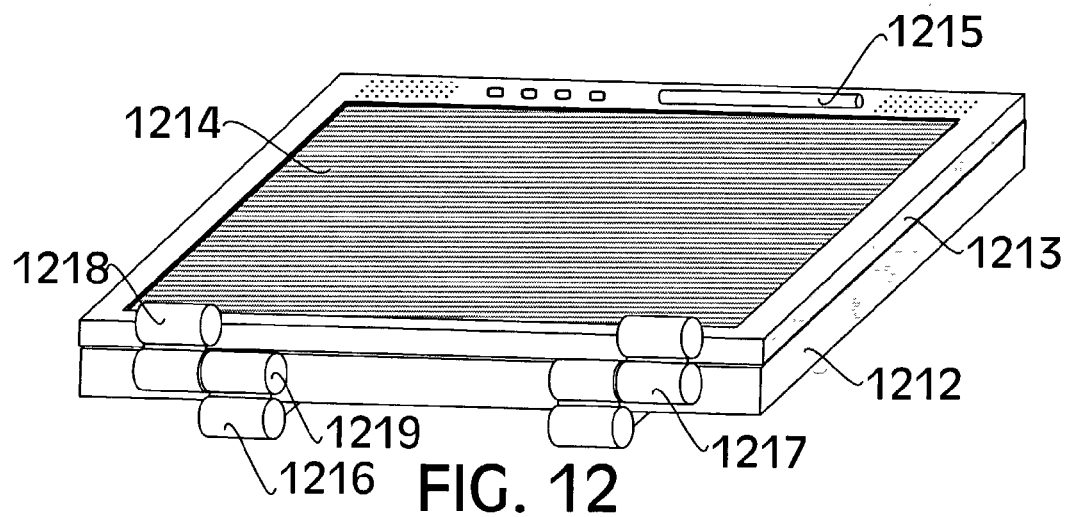
FIG. 12 illustrates another alternative embodiment of a user interactive configuration of a computing device with a fully active display area, a base housing being pivotally displaced to a coplanar position adjacent with the back surface of the display and a keyboard housing being pivotally displaced to a coplanar position adjacent with the base housing.

FIG. 12 illustrates another alternative embodiment of a user interactive configuration of a computing device with a fully active display area 1214, a base housing 1212 being pivotally displaced about pivot axis 1217 and pivot axis 1218 to a coplanar position adjacent with the back surface of the display 1213, and a keyboard housing 1211 being pivotally displaced about pivot axis 1216 and pivot axis 1219 to a coplanar position adjacent with the base housing 1212. For one embodiment of the computing device, the entire display area 1214 of display 1213 is active to display output and to transmit user input.

Figure 13:
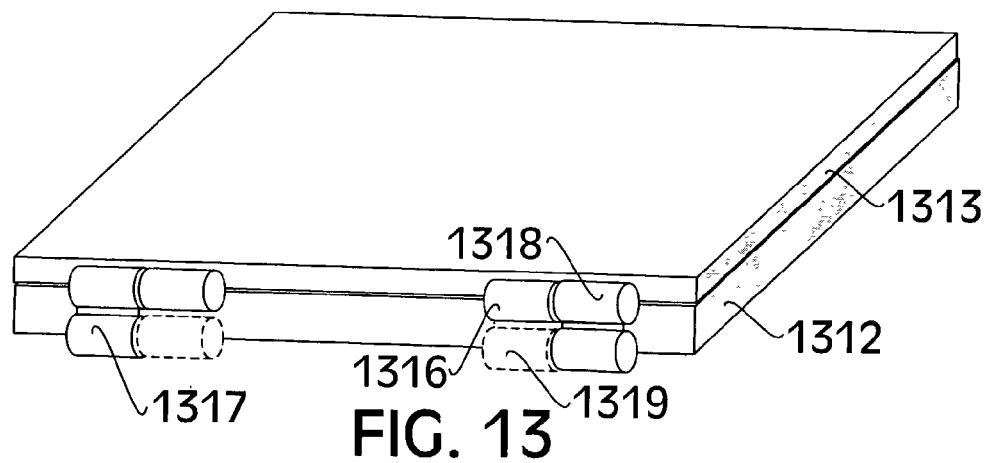
FIG. 13 illustrates a closed standby or shut down configuration of the computing device of FIG. 11 or of FIG. 12.

FIG. 13 illustrates a closed standby or shut down configuration of the computing device of FIG. 11 or of FIG. 12. A keyboard housing is pivotally displaced about pivot axis 1316 and optionally about pivot axis 1319. Base housing 1312 is pivotally displaced about pivot axis 1317 and pivot axis 1318. Both are displaced to substantially coplanar positions adjacent with display 1313. For one embodiment of the computing device, sensing the closed position of base housing 1312 with respect to display 1313, base housing 1312 enters a standby or shut down configuration.

FIG. 14a illustrates in detail one alternative embodiment of a closed, standby or shut down configuration of a transformable computing device. Keyboard housing 1411 is pivotally displaced about pivot axis 1418 and optionally about pivot axis 1417. Base housing 1412 is pivotally displaced about pivot axis 1417 and pivot axis 1418. Both are displaced to substantially coplanar positions adjacent with display housing 1413. For one embodiment of the computing device, sensing the closed position, base housing 1412 enters a standby or shut down configuration.

FIG. 14b illustrates in detail a user interactive configuration of the transformable computing device of FIG. 14a with keyboard housing 1411 optionally displaced about pivot axis 1418 and pivot axis 1417 to a mode of reduced power consumption while base housing 1412 is pivotally displaced about pivot axis 1417 and pivot axis 1418 to a coplanar position adjacent with the back surface of display housing 1413.

FIG. 14c illustrates in detail another user interactive configuration of the transformable computing device of FIG. 14a with a fully active display 1413, keyboard housing 1411 being supported by base housing 1412 which is pivotally displaced to form an angle of substantially 90 degrees with the front surface of display housing 1413.

FIG. 15a illustrates in detail another alternative embodiment of a closed, standby or shut down configuration of a transformable computing device. Keyboard housing 1511 is pivotally displaced about pivot axis 1516 and pivot axis 1518. Base housing 1512 is pivotally displaced about pivot axis 1517 and pivot axis 1518. Both are displaced to substantially coplanar positions adjacent with display housing 1513. For one embodiment of the computing device, sensing the closed position, base housing 1512 enters a standby or shut down configuration.

FIG. 15b illustrates in detail a user interactive configuration of the transformable computing device of FIG. 15a with keyboard housing 1511 displaced about pivot axis 1516 and pivot axis 1518 to a mode of reduced power consumption while base housing 1512 is pivotally displaced about pivot axis 1517 and pivot axis 1518 to a coplanar position adjacent with the back surface of display 1513.

FIG. 15c illustrates in detail another user interactive configuration of the transformable computing device of FIG. 15a with a fully active display 1513 pivotally attached about pivot axis 1518, keyboard housing 1511 pivotally attached about pivot axis 1516 to pivot axis 1518, and being supported by base housing 1512, which is pivotally displaced about pivot axis 1517 and pivot axis 1518 to form an angle of substantially 90 degrees with the front surface of display 1513.

FIG. 16a illustrates in detail another alternative embodiment of a closed, standby or shut down configuration of a transformable computing device. Both keyboard housing 1611, pivotally displaced about pivot axis 1616 and pivot axis 1619; and base housing 1612, pivotally displaced about pivot axis 1617, are displaced to substantially coplanar positions adjacent with display housing 1613. Base housing 1612 enters a standby or shut down configuration.

FIG. 16*b* illustrates in detail a user interactive configuration of the transformable computing device of FIG. 16*a* with keyboard housing 1611 optionally displaced about pivot axis 1616 and pivot axis 1619 to a mode of reduced power consumption while base housing 1612 is pivotally displaced about pivot axis 1617 and pivot axis 1618 to a coplanar position adjacent with the back surface of display 1613.

FIG. 16*c* illustrates in detail another user interactive configuration of the transformable computing device of FIG. 16*a* with a fully active display 1613 pivotally attached about pivot axis 1618, keyboard housing 1611 pivotally attached about pivot axis 1616 to pivot axis 1619, and being supported by base housing 1612, which is pivotally displaced about pivot axis 1617 and pivot axis 1618 to form an angle of substantially 90 degrees with the front surface of display 1613.

Figure 17A:
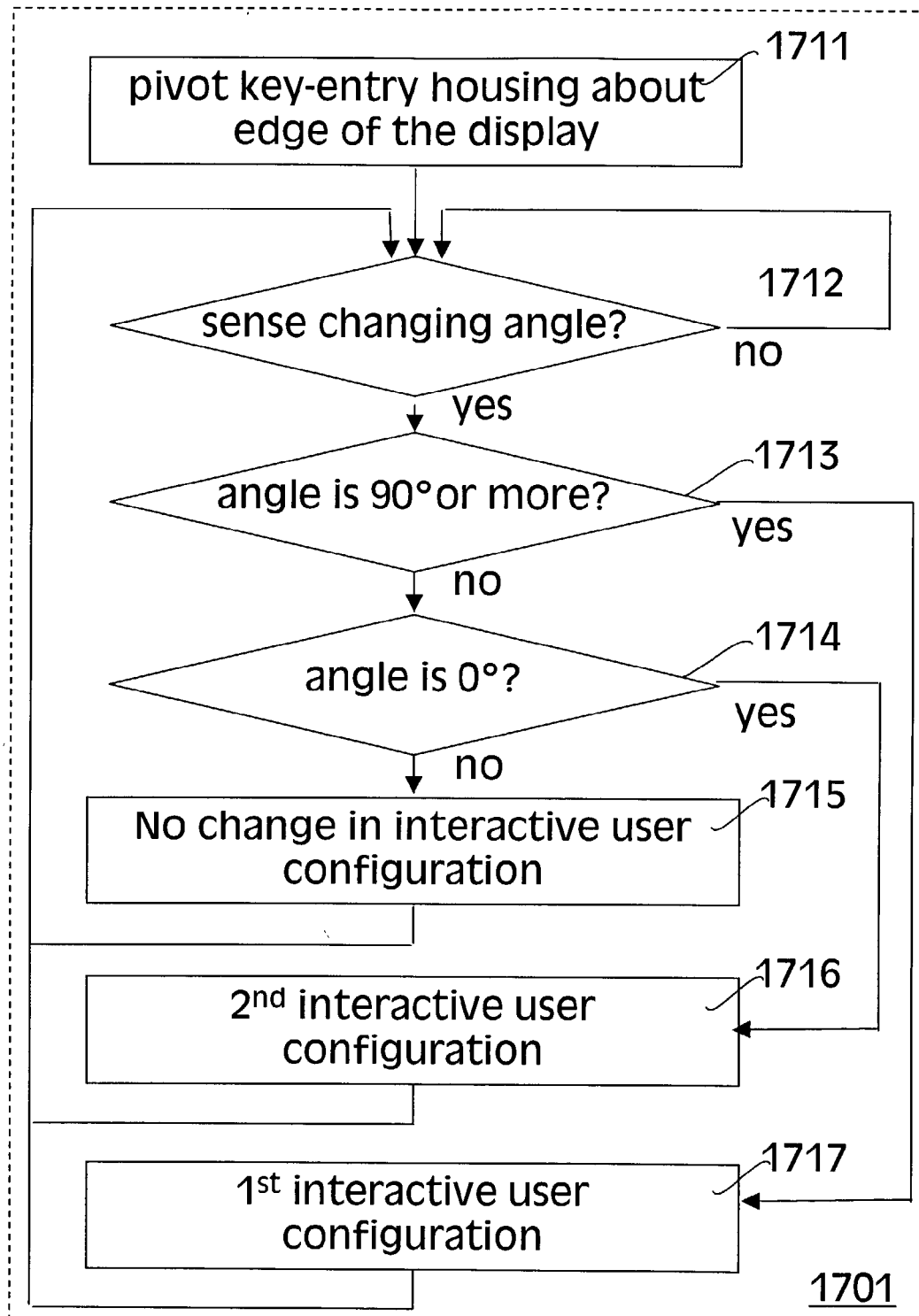
FIG. 17a illustrates a flow diagram for one embodiment of a process for configuring a plurality of user interactive modes of a transformable computing device.

FIG. 17*a* illustrates a flow diagram for one embodiment of a process for configuring a plurality of user interactive modes of a transformable computing device. Processing blocks that perform process 1701 and other processes herein disclosed may comprise dedicated hardware or software or firmware operation codes executable by general purpose machines or by special purpose machines or by a combination of both.

In processing block 1711 a key-entry housing is being pivoted about an edge of a display. Processing then proceeds in processing block 1712. In processing block 1712 a check is performed to see if a change in angle is sensed. If not, processing continues in processing block 1712 until a change is sensed. Otherwise, processing proceeds in processing block 1713 where the angle is checked to see if it is substantially ninety (90) degrees or more. If so, processing proceeds in processing block 1717 where the first interactive user configuration is initiated and processing then continues in processing block 1712 until another change in angle is sensed. Otherwise, processing proceeds in processing block 1714 where the angle is checked to see if it is substantially zero (0) degrees. If so, processing proceeds in processing block 1716 where the second interactive user configuration is initiated and processing then continues in processing block 1712 until another change in angle is sensed. Otherwise, processing proceeds in processing block 1715 where no change in interactive user configuration is initiated and processing returns to processing block 1712 until a new change in angle is sensed.

Figure 17B:
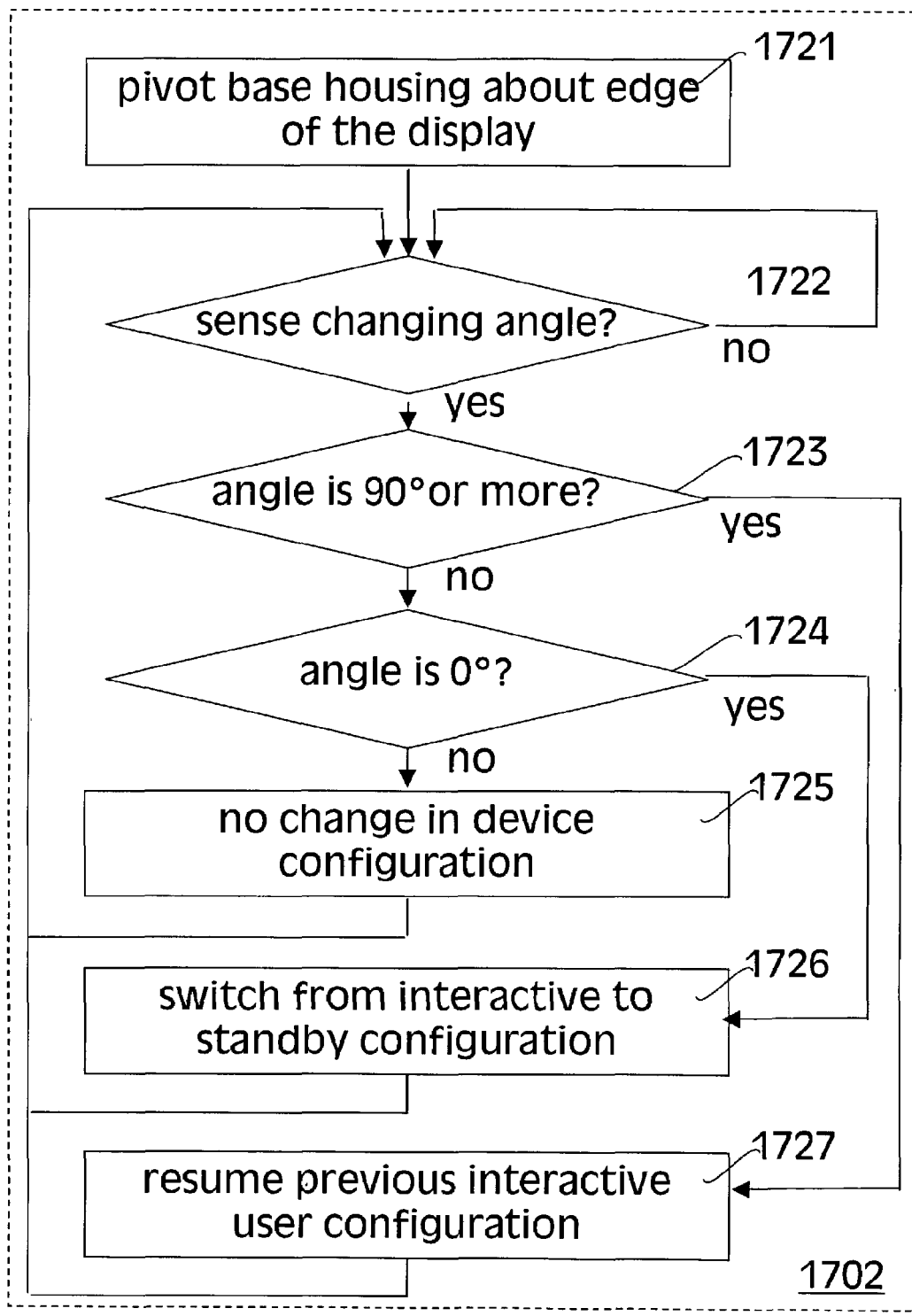
FIG. 17b illustrates a flow diagram for one embodiment of a process for optionally configuring between a plurality of user interactive modes and a standby mode of a transformable computing device.

FIG. 17*b* illustrates a flow diagram for one embodiment of a process 1702 for optionally configuring between a plurality of user interactive modes and a standby mode of a transformable computing device. In processing block 1721 a base housing is being pivoted about an edge of a display. Processing then proceeds in processing block 1722. In processing block 1722 a check is performed to see if a change in angle is sensed. If not, processing continues in processing block 1722 until a change is sensed. Otherwise, processing proceeds in processing block 1723 where the angle is checked to see if it is substantially ninety (90) degrees or more. If so, processing proceeds in processing block 1727 where the previous interactive user configuration is resumed and processing then continues in processing block 1722 until another change in angle is sensed. Otherwise, processing proceeds in processing block 1724 where the angle is checked to see if it is substantially zero (0) degrees. If so, processing proceeds in processing block 1726 where the current interactive user configuration is switched to a standby configuration and processing then continues in processing block 1722 until another change in angle is sensed. Otherwise, processing proceeds in processing block 1725 where no change in device configuration is initiated and processing returns to processing block 1722 until a new change in angle is sensed.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method comprising:
    opening a first housing attached with a display device having a first display area and a second display area;
    uncovering the second display area to activate the second display area;
    closing the first housing over the display device to cover the second display area and place the display device in a first mode of reduced power consumption, wherein the first display area is visible and is active; and
    closing a second housing over the display device to cover the first display area and to place the display device in a second mode of reduced power consumption.

2. The method of claim 1 wherein the first display area and the second display area are both deactivated in the second mode.

3. The method of claim 1 wherein the first display area is active to accept user input in the first mode.

4. The method of claim 3 wherein the first display area is touch sensitive in the first mode.

5. The method of claim 1 wherein the second display area is touch sensitive and is activated to accept user input by opening the first housing.

6. The method of claim 1 wherein the first mode of reduced power consumption is accomplished in part by deactivating back-lighting for the second display area.

7. A method comprising:
    placing a display device in a first mode of reduced power consumption by closing a first housing ova the display device having a first display area and a second display area to cover the second display area, wherein the first display area is visible and active to display scrolled output; and
    placing the display device in a second mode of greater power consumption than the first mode by opening the first housing to uncover the second display area, wherein the second display area is active.

8. The method of claim 7 further comprising:
    closing a second housing over the display device to cover the first display area and to place the display device in a third mode of reduced power consumption with respect to the second mode, the third mode different from the first mode.

9. The method of claim 8 wherein the first display area and the second display area both deactivated in the third mode.

10. The method of claim 7 wherein the first display area is touch sensitive in the first mode.

11. The method of claim 10 wherein the second display area is touch sensitive and is activated to accept user input by opening the first housing.

12. An apparatus comprising:
a first housing having a first edge, the first housing comprising a display device having a first display area and a second display area;
a second housing pivotally attached with said first housing proximate said first edge in a first closed position substantially coplanar with the first housing wherein the second display area is placed in a mode of reduced power consumption and is visually obscured by the second housing but the first display area is visible and is activated to display output, the second housing pivotally displaceable to a first open position wherein the first display area and the second display area are both visible and are both activated to display output; and
a third housing pivotally attached with said second housing displaceable to a second closed position substantially coplanar with the first housing wherein the first display area and the second display area are both covered and are both deactivated to display output, the third housing displaceable to a second open position wherein at least the first display area is visible and is activated to display output.

13. The apparatus of claim 12 wherein the second housing comprises a keyboard.

14. The apparatus of claim 13 wherein the third housing comprises a central processing unit.

15. A computing system comprising:
an addressable memory to store data;
a processor to access data from said addressable memory responsive to user input;
a display device to display data output from said processor, the display device having a first display area and a second display area;
a keyboard pivotally attached with said display device in a first closed position wherein the second display area is placed in a mode of reduced power consumption and is visually obscured by the keyboard but the first display area is visible and is activated to display output, the keyboard pivotally displaceable to a first open position wherein the first display area and the second display area are both visible and are both activated to display output data; and
a housing pivotally attached with said keyboard in a second closed position substantially coplanar with the display device wherein the first display area and the second display area are both covered and are both deactivated to display output, the housing displaceable to a second open position wherein at least the first display area is visible and is activated to display output data.

16. The computing system of claim 15 wherein the first display area and the second display area both deactivated in the second closed position.

17. The computing system of claim 16 wherein the first display area is touch sensitive in the first closed position.

18. The computing system of claim 17, said keyboard to accept user input in the first open position.

19. The computing system of claim 15, said keyboard to accept user input in the first closed position.

20. The computing system of claim 19 wherein the second display area is touch sensitive and is activated to accept user input in the first open position.

* * * * *